United States Patent
Vulkan et al.

(10) Patent No.: US 9,434,246 B2
(45) Date of Patent: Sep. 6, 2016

(54) FUEL VALVE

(75) Inventors: Omer Vulkan, D.N. Hanegev (IL); Vladimir Olshanetsky, Beer Sheva (IL); Alexander Khiliminsky, Beer Sheva (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 0 days.

(21) Appl. No.: 13/985,304

(22) PCT Filed: Mar. 13, 2012

(86) PCT No.: PCT/IL2012/050085
§ 371 (c)(1),
(2), (4) Date: Aug. 14, 2013

(87) PCT Pub. No.: WO2012/123941
PCT Pub. Date: Sep. 20, 2012

(65) Prior Publication Data
US 2013/0312841 A1    Nov. 28, 2013

Related U.S. Application Data

(60) Provisional application No. 61/452,325, filed on Mar. 14, 2011.

(51) Int. Cl.
*B60K 15/035* (2006.01)
*F16K 24/04* (2006.01)

(52) U.S. Cl.
CPC ....... *B60K 15/03519* (2013.01); *F16K 24/042* (2013.01); *Y10T 137/0874* (2015.04); *Y10T 137/3099* (2015.04); *Y10T 137/7436* (2015.04)

(58) Field of Classification Search
CPC .................................................. F16K 24/044
USPC ............ 123/516; 137/202, 38, 423, 43, 433, 137/589
See application file for complete search history.

(56) References Cited

U.S. PATENT DOCUMENTS

| | | | |
|---|---|---|---|
| 4,781,218 A | 11/1988 | Mori et al. | |
| 5,402,818 A * | 4/1995 | Kasugai et al. | 137/198 |
| 5,738,132 A | 4/1998 | Zakai et al. | |
| 5,775,362 A * | 7/1998 | Sato et al. | 137/202 |
| 5,873,384 A | 2/1999 | Pedersen et al. | |

(Continued)

FOREIGN PATENT DOCUMENTS

| | | |
|---|---|---|
| CN | 1152348 A | 6/1997 |
| EP | 1 782 992 A1 | 5/2007 |

(Continued)

OTHER PUBLICATIONS

International Search Report for PCT/IL2012/050085, two pages, mailed Jun. 29, 2012.

*Primary Examiner* — R. K. Arundale
(74) *Attorney, Agent, or Firm* — Vorys, Sater, Seymour & Pease LLP

(57) ABSTRACT

Provided is a fuel valve including a uniform valve housing accommodating a roll-over valve (ROV), an over-pressure relief valve (OPR) and a pressure retention valve (PRV), wherein a pressure retention disc is substantially axially displaceable within a top chamber of the valve housing, between a normally closed portion in which it sealingly bears over an outlet port of the flow path and an open position; the pressure retention disc is configured with a cutout portion at least partially enveloping a pressure relief port of the valve.

15 Claims, 4 Drawing Sheets

(56) References Cited

U.S. PATENT DOCUMENTS

| | | | |
|---|---|---|---|
| 6,755,206 B2 * | 6/2004 | Nishi et al. | 137/202 |
| 6,913,295 B2 * | 7/2005 | Kimisawa et al. | 285/423 |
| 6,966,330 B2 * | 11/2005 | Frohwein | 137/202 |
| 7,543,597 B2 * | 6/2009 | Leonhardt | 137/202 |
| 7,784,484 B2 * | 8/2010 | Furuya | 137/202 |
| 8,109,285 B2 | 2/2012 | Ehrman et al. | |
| 8,720,471 B2 * | 5/2014 | Yasuda et al. | 137/202 |
| 2004/0060596 A1 * | 4/2004 | Frohwein et al. | 137/202 |

FOREIGN PATENT DOCUMENTS

| | | |
|---|---|---|
| GB | 2 202 034 A | 9/1988 |
| GB | 2 313 593 A | 12/1997 |
| JP | 2009-79752 A | 4/2009 |
| JP | 2010-70067 A | 4/2010 |
| SU | 1575949 A3 | 6/1990 |

* cited by examiner

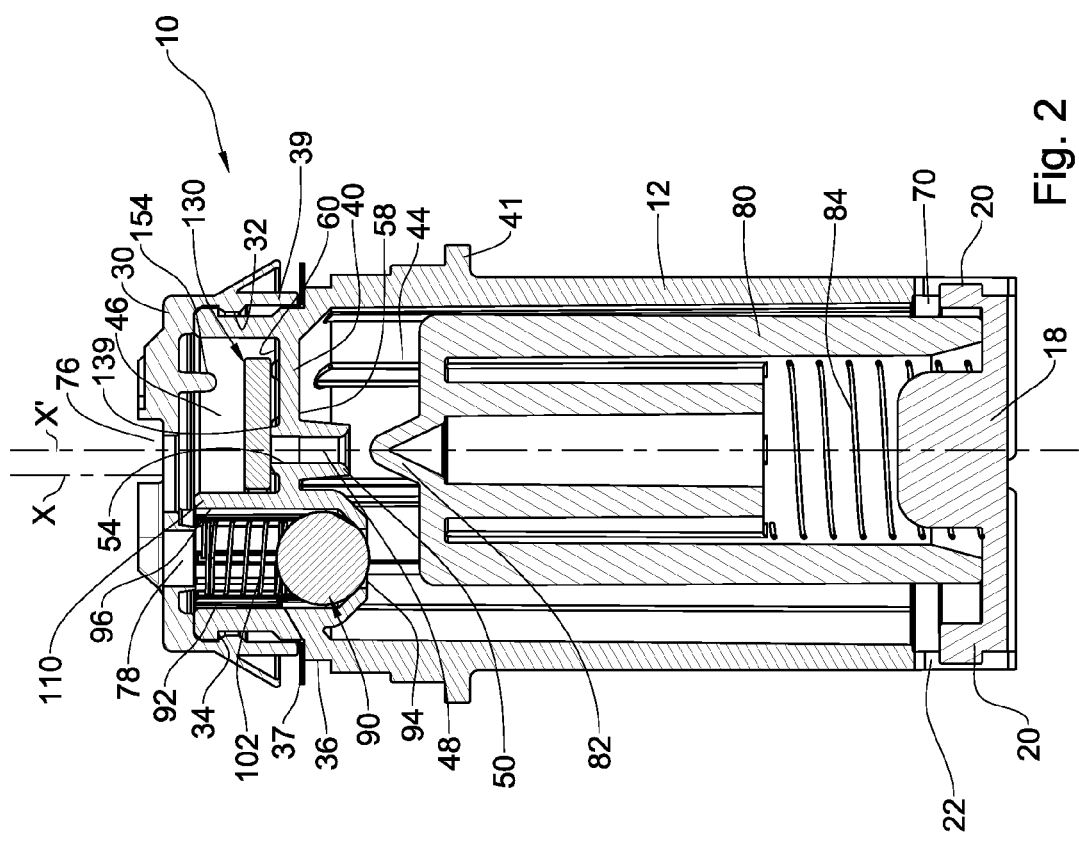
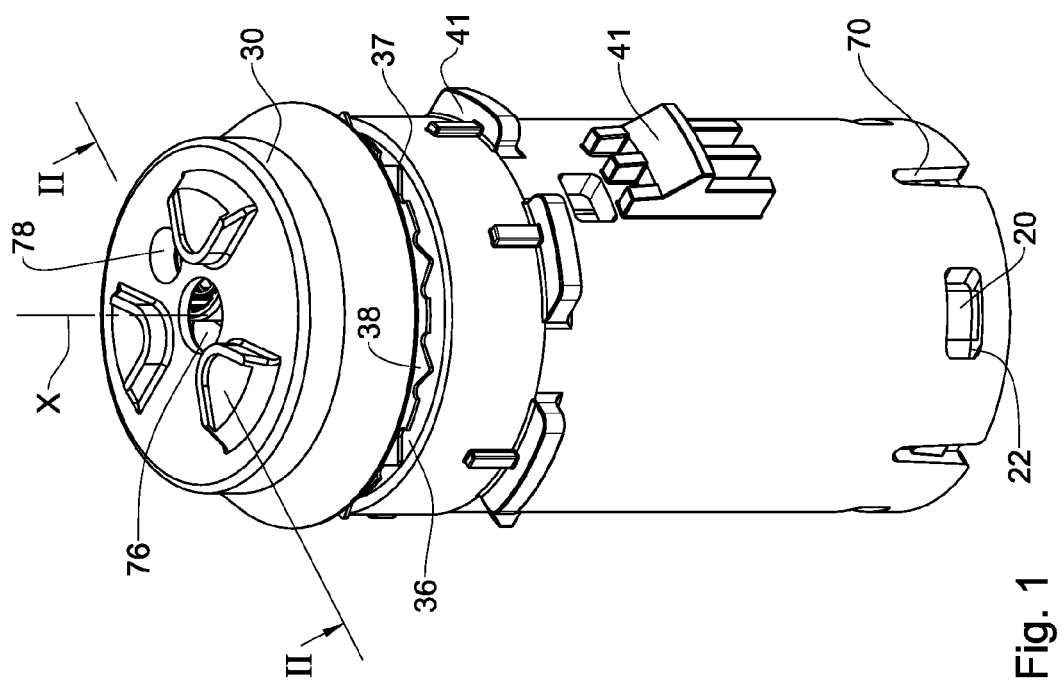

FUEL VALVE

FIELD OF THE DISCLOSED SUBJECT MATTER

The present disclosed subject matter relates to a fuel valve and more particularly it is concerned with a roll-over valve (ROV) combined with an over-pressure relief valve (OPR) and a pressure retention valve (PRV), at times referred to also as a holding pressure function—HPF.

BACKGROUND OF THE DISCLOSED SUBJECT MATTER

A variety of roll-over fuel valves are known, also such combined with other functions.

For example, U.S. Pat. No. 5,738,132 discloses a roll over vent valve comprising: a housing having a fluid inlet and a fluid outlet, the latter comprising a substantially elongated slit-like outlet aperture of the housing bounded by a valve seating. There is furthermore provided a float member located in the housing and axially displaceable within the housing between the inlet and the outlet; an elongated flexible closure membrane strip anchored at one end thereof to an end of the float member adjacent the outlet and at a portion thereof offset with respect to the outlet; spring biasing means located within the housing and bearing on the float member so as to spring bias it in the direction of the outlet; whereby the spring biasing together with buoyancy forces acting on the float member tend to press the membrane strip into sealing engagement with the outlet aperture whilst gravity forces acting on the float member tend to displace the float member away from the outlet so as to progressively detach the strip from sealing engagement with the outlet.

U.S. Pat. No. 8,109,285 is directed to a roll-over vent valve, comprising: a housing formed with a fluid inlet and a fluid outlet, a valve seating bounding an outlet aperture of the housing, a float member comprising a sealing member, the float member received within the housing and axially displaceable between a sealed position wherein the sealing member sealingly bears against the valve seating of the outlet aperture to seal the fluid outlet, and an open position wherein the sealing member is disengaged from the valve seating whereby the fluid outlet is in flow communication with the fluid inlet; a pressure-retention device extending intermediate the valve seating and the fluid outlet, to thereby shut fluid flow therebetween as long as pressure differential between the fluid inlet and the fluid outlet does not exceed a minimal pressure threshold; and a one-way fluid inlet valve being in flow communication with said fluid outlet to allow fluid flow towards the fluid inlet at a substantially high flow rate in the event of under-pressure at the fluid inlet, the one-way fluid inlet valve comprising a cage having an inlet port provided through a wall portion of the housing and being in flow communication with the fluid outlet of the roll-over vent valve, and an outlet port provided through a cage closure fixed to the housing and being in flow communication with the fluid inlet of the roll-over vent valve, wherein the cage closure and the wall portion define therebetween a gap in which a sealing member is freely retained thereby being displaceable and deformable within the gap between sealing engagement of the inlet port and disengagement therefrom.

It is an object of the presently disclosed subject matter to provide a roll-over valve (ROV) integrated with an over-pressure relief valve (OPR) and a pressure retention valve (PRV).

SUMMARY OF THE DISCLOSED SUBJECT MATTER

According to the presently disclosed subject matter there is provided a fuel valve comprising a uniform valve housing accommodating a roll-over valve (ROV), an over-pressure relief valve (OPR) and a pressure retention valve (PRV), wherein a pressure retention disc substantially axially displaceable within the top chamber between a normally closed portion in which it sealingly bears over an outlet port of the flow path and an open position; said pressure retention disc is configured with a cutout portion at least partially enveloping the pressure relief port.

According to a particular design there is provided a fuel valve comprising a uniform valve housing accommodating a roll-over valve (ROV), an over-pressure relief valve (OPR) and a pressure retention valve (PRV), wherein the housing is configured with a partition wall defining a fluid flow path extending between a bottom chamber configured with a valve inlet and a top chamber configured with a valve outlet; said bottom chamber accommodates a spring loaded float member axially displaceable between a closed position wherein a sealing head of the float member sealingly engages an inlet port of said flow path, and a normally open position wherein the sealing head is disengaged from said inlet port; a pressure relief port extending between the bottom chamber and a valve outlet and being normally sealed by a sealing plunger biased into sealing engagement within the top chamber; and a pressure retention disc substantially axially displaceable within the top chamber between a normally closed portion in which it sealingly bears over an outlet port of the flow path and an open position; said pressure retention disc is configured with a cutout portion at least partially enveloping the pressure relief port.

Any one or more of the following features and configurations can be incorporated in a valve according to the disclosed subject matter, in combination or independently:

The fuel valve is configured for assembly at any location of a fuel tank, setting as a particular example a fuel delivery module of a fuel tank;

The relief portion of the pressure retention disc has a crescent-like or U-like or kidney-like shape;

The outlet port of the flow path has an annular rim elevated from a top face of the partition wall, said annular rim configured for sealingly bearing the pressure retention disc when at the closed position;

The partition wall is configured with at least one disc support upwardly extending from the top face, said at least one disc support extending slightly below the annular rim of the flow path. The at least one disc support provided to prevent clamping of the pressure retention disc within the top chamber.

The at least one disc support can be configured as an annular or a segmented support, or as a plurality of projections;

The pressure retention disc has a circle segment removed, substantially opposite the relief portion, to thereby facilitate fast pressure relief;

A top cap of the valve is configured with at least one projection extending into the top chamber, restricting displacement of the pressure retention disc in the open position thereof. Said at least one projection extending from a bottom surface of the top cap;

The shape, thickness and weight of the pressure retention disc define the retention pressure, i.e. the pressure at which the pressure retention disc will displace from its normally closed position to its open position, during filling a fuel tank (the higher a filling neck of a fuel tank extends, the pressure retention disc should be configured for retaining a higher pressure);

The sealing plunger is spherical;

The biasing force applied to the sealing plunger, defines a pressure threshold for displacing the over-pressure relief valve (OPR) into the open position;

The valve outlet of the over-pressure relief valve (OPR) and an outlet of the top chamber are discrete.

The center of gravity of the pressure retention disc coextends substantially above the fluid flow path.

The float member is axially displaceable within the housing along a longitudinal axis offset from a longitudinal axis of the housing.

According to another aspect of the present disclosed subject matter there is a fuel tank assembly configured with a fuel valve of said specified type.

BRIEF DESCRIPTION OF THE DRAWINGS

In order to understand the present disclosed subject matter and to see how it may be carried out in practice, embodiments will now be described, by way of a non-limiting example only, with reference to the accompanying drawings, in which:

FIG. 1 is top perspective view of a valve according to the presently disclosed subject matter:

FIG. 2 is a longitudinal section taken along line II-II in FIG. 1;

DETAILED DESCRIPTION OF EMBODIMENTS

Figures 3, 4:
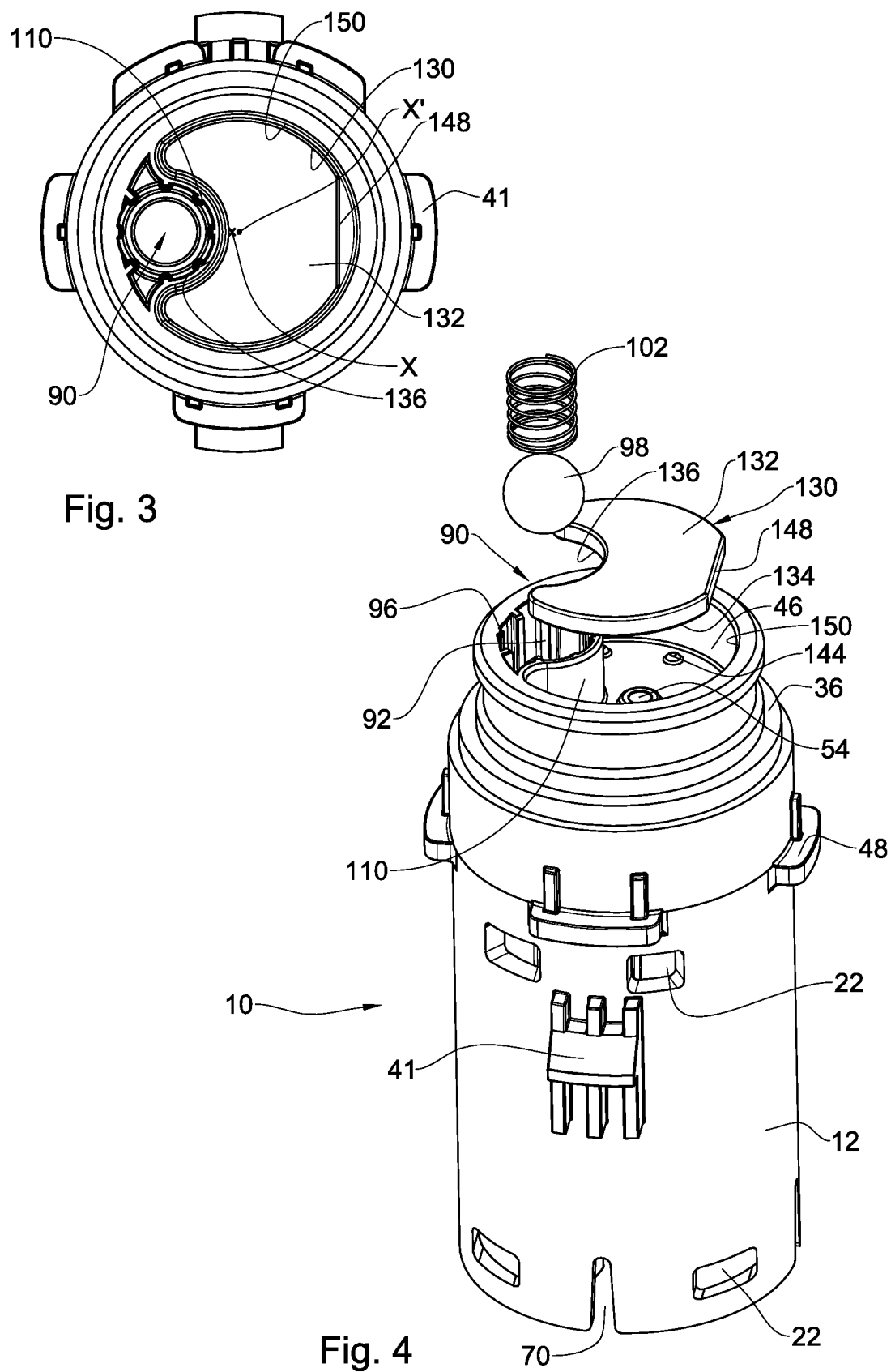
FIG. 3 is a top view of the valve of FIG. 1, with a top cap of the valve removed for visualizing the top chamber.
FIG. 4 is a partially exploded top perspective view, with a top cap of the valve removed.
Figure 5:
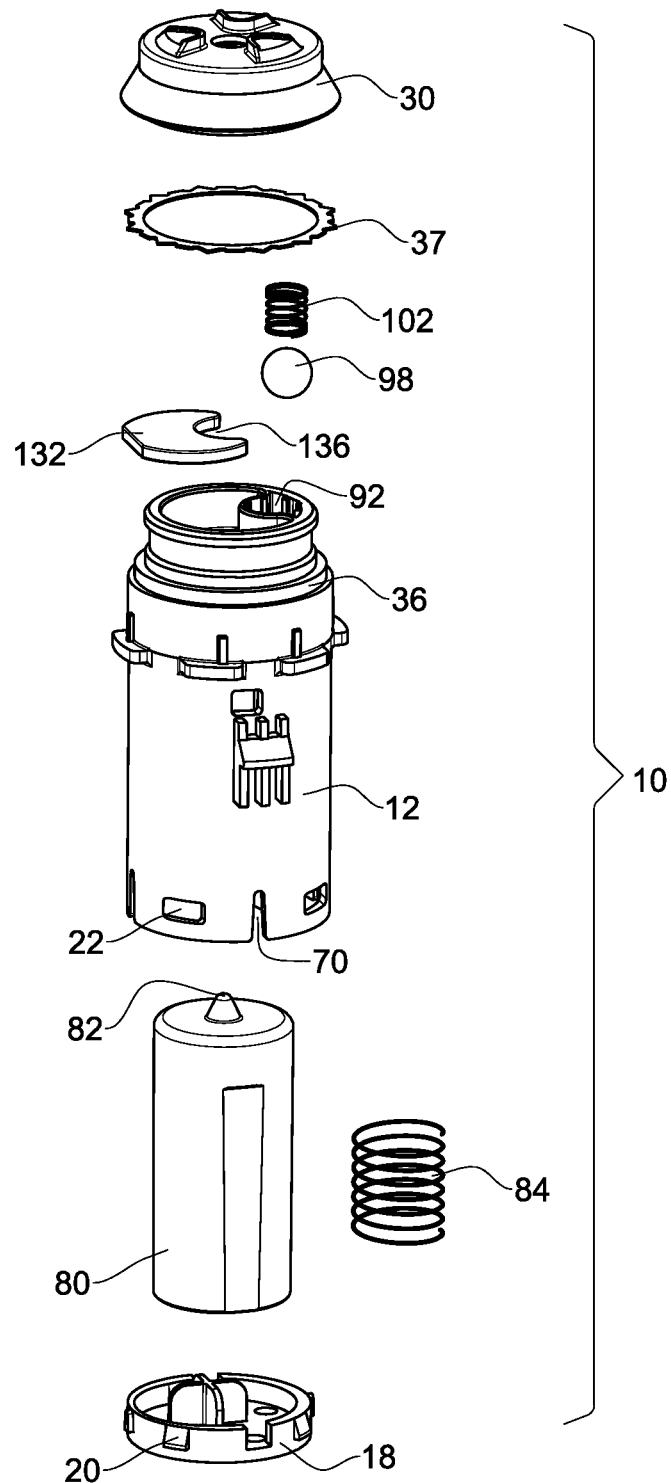
FIG. 5 top perspective exploded view of the valve according to the presently disclosed subject matter.

With reference being made to FIGS. 1 to 5 there is illustrated a valve generally designated 10, in accordance with the present disclosed subject mater.

The valve 10 comprises a cylindrical housing 12 extending along a longitudinal axis X and is fitted with a bottom cap 18 (FIGS. 2 and 5) snap-fitted at a bottom end of the housing 12 by several lateral projections 20 snapingly engaged into openings 22 near the bottom edge of the housing 12. A top cap 30 is snap-fitted at a top of the housing and is engaged thereto by an annular rim 32 snapingly engaged under an annular shoulder 34 at a top edge of the housing 12.

Fitted over a neck 36 of the housing 12 there is a fuel tank mounting crown 37, in the form of a metal disc configured with a plurality of spikes 38 for engagement, within an opening at a location of the fuel tank. The crown 38 is retained over the neck 36 by a downward extending retention ring 39 within the top cap 30. It is noted that the housing 12 is further configured with several lateral projections 41 to facilitate coupling the valve 10 at different configurations within fuel tanks. It is appreciated that a valve according to the disclosed subject matter can be positioned at any location, though typically it is configured for application at a fuel delivery module of the fuel tank assembly, namely in neighboring a fuel pump, a fuel gauge and other fuel valves.

The housing 10 is configured with a partition wall 40 defining a bottom chamber 44 and a top chamber 46 with a fluid flow path 48 extending through the partition wall 40 and having an inlet port 50 at the bottom chamber 44, and an outlet port 54 at the top chamber 46. As can be seen, in the particular example both the inlet port 50 and the outlet port 54 are circular and project from the bottom wall face 58 and top wall face 60 of the partition wall 40, respectively.

As can further be seen, the bottom chamber 44 is configured with a plurality of openings 70 at the housing 10, serving as valve fluid inlets to thereby facilitate fluid flow between the fuel tank (not shown) and the bottom chamber 44 of the valve 10. The top cap 30 is configured with a valve outlet port 76 extending from the top chamber 46. An over-pressure relief fluid outlet port 78 extends from the top cap 30, to be discussed hereinafter. When assembled within a fuel tank, said valve outlet port 76 and said over-pressure relief outlet port 78 extend through suitable piping (not shown) to a fuel vapor recovery system.

Received within the bottom chamber 44 there is a float member 80 serving as a roll-over valve (ROV) and configured at a top end thereof with a cone-shaped sealing projection 82 shaped and sized for sealing engagement of the annular inlet port 50. A coiled spring 84 bears at its bottom end on the bottom cap 18 and is partially supported within the float member 80 and has its top end bearing against the float member 80, applying thereto a moderate biasing force. The arrangement is such that the float member 80 is axially displaceable within the housing 12 along a longitudinal axis X' parallel to longitudinal axis X of the housing, however offset (non-coaxial) with one another (FIGS. 2 and 3). It is appreciated that only if the float member, and in particular the sealing projection symmetrically extends about the corresponding annular inlet port 50, the float member may be free to rotate about its longitudinal axis X'. Fluid flow path 48 extends coaxial with axis X'.

Figure 6A:
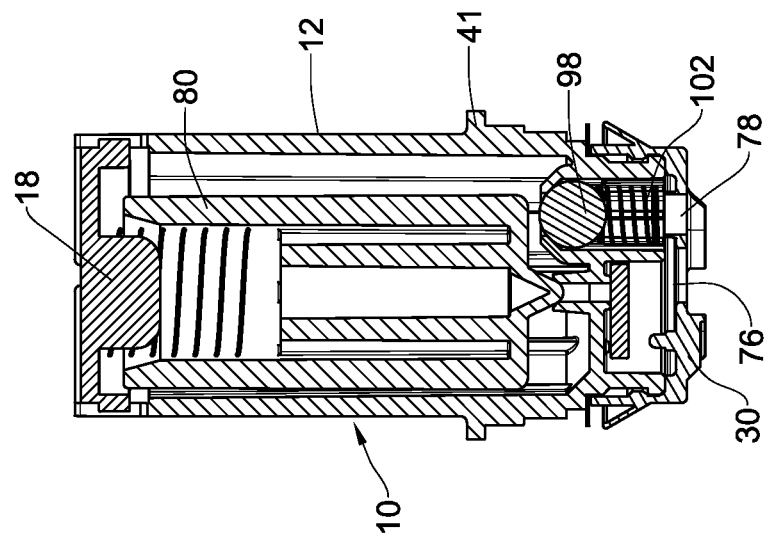
FIG. 6A illustrates the valve according to the presently disclosed subject matter with the over-pressure relief valve displaced into its open position.

Further disposed at the partition wall, between the bottom chamber 44 and the top chamber 46, there is configured an over-pressure relief valve (OPR) generally designated 90 and comprising a cylindrical fluid port 92 having a bottom pressure port 94 within the bottom chamber 44 and a pressure relief port 96 not extending through the top chamber 46, said pressure relief port 96 coextending with the over-pressure relief fluid outlet port 78 at the top cap 30. Received within the cylindrical fluid port 92 there is a sealing plunger in the form of a sealing sphere 98 spring biased by a coiled spring 102 bearing at a bottom end against the sealing sphere 98 and a top end against a bottom surface of the top cap 30, wherein the sealing sphere 98 is displaceable between a normally closed position (FIGS. 2, 6B and 6C) and an open position (FIG. 6A). At the normally closed position the sealing sphere 98 sealingly bears against the bottom pressure port 94, thus preventing fluid flow and pressure discharge between the bottom chamber 44 and the top chamber 46, and at the open position fluid flow and pressure discharge between the chambers is facilitated. It is appreciated that the force of the coiled spring 102 determines the pressure threshold at which the normally closed over-pressure relief valve (OPR) 90 will open. More so, at the event of rollover of a vehicle, the over-pressure relief valve (OPR) 90 will remain at its closed position to prevent fuel flow from the fuel tank.

It is seen in the figures that the cylindrical fluid port 92 of the over-pressure relief valve (OPR) 90 extends parallel to the fluid flow path 48 extending through the partition wall 40 and are both parallel to the longitudinal axis X, there being a wall portion 110 within the top chamber (best seen in FIG. 4), partitioning the cylindrical fluid port 92 of the over-pressure relief valve (OPR) 90 from the top chamber 46, such that said paths are discrete.

The valve 10 is further configured with a pressure retention valve (PRV), generally designated 130 wherein a pressure retention disc 132 is received within the top chamber 46 and substantially axially displaceable between a normally closed portion (FIGS. 2 and 6A) in which a bottom face 134 thereof sealingly bears over the outlet port 54 of the flow path, and an open position in which the pressure retention disc 132 is displaced from the outlet port 54 and facilitates fluid flow therethrough. As seen in the drawings, the pressure retention disc is configured with a cutout portion 136 at least partially enveloping the wall portion 110 of the pressure relief port of the over-pressure relief valve (OPR) 90, said cutout portion 136 has a crescent-like or U-like or kidney-like shape. This configuration facilitates the compact structure of the valve comprising in one housing the three functions, namely a roll-over valve (ROV) combined with an over-pressure relief valve (OPR) and a pressure retention valve (PRV; at times referred to also as a holding pressure function—HPF).

The arrangement is such that the center of gravity of the pressure retention disc 132 is calculated to extend through longitudinal axis X', i.e. extending offset the longitudinal axis X and substantially above the fluid flow path 48.

It is seen that the outlet port 54 of the flow path 48 has an annular rim 139 elevated from a top face 60 of the partition wall 40, said annular rim 139 configured for sealingly bearing the bottom surface 134 of the pressure retention disc 132 when at the closed position (FIGS. 2 and 6A).

Furthermore, the partition wall 40 is configured with a plurality of disc support bulges 144 upwardly projecting from the top face 60, said disc supports extending slightly below the annular rim 139 of the flow path 48, said disc supports provided to prevent clamping of the pressure retention disc within the top chamber 46. The at least one disc support can be configured as an annular or a segmented support, or as a plurality of projections as illustrated in the present example.

The pressure retention disc has a circle segment 148 removed (best seen in FIGS. 3 and 4), substantially opposite the cutout portion 136, to thereby facilitate fast pressure relief and smooth displacement of the disc within the top chamber, i.e. to prevent its clamping against inside side walls 150 of the top chamber 46. For that purpose, all radius of the pressure retention disc 132 are chamfered, i.e. smoothened.

The shape, thickness and weight of the pressure retention disc 132 define the retention pressure, i.e. the pressure at which the pressure retention disc 132 will displace from its normally closed position (FIG. 6A) to its open position (FIG. 6B), during filling a fuel tank (the higher a filling neck of a fuel tank extends, the pressure retention disc should be configured for retaining a higher pressure).

Furthermore, the top cap 30 is configured with at least one projection 154 extending into the top chamber 46, restricting displacement of the pressure retention disc 132 in the open position thereof (FIG. 64) and preventing blocking of the valve outlet port 76.

With reference now being made to FIGS. 2 and 6A to 6C different operating positions of the valve 10 when mounted in a vehicle's fuel tank (not shown) are illustrated.

In use, under normal operating conditions (FIG. 2) the roll-over valve (ROV) function is at its normally open position and however the over-pressure relief valve (OPR) 90 is at its normally closed position and the pressure retention valve (PRV) 130 is also at its normally closed position.

FIG. 6A illustrates a position at which pressure builds up at the fuel tank (not shown), resulting in displacement of the over-pressure relief valve (OPR) 90 into its open position. The roll-over valve (ROV) remains at its normally open position and it is not unlikely that at this position the pressure retention valve (PRV) 130 will also displace into its open position.

Figure 6B:
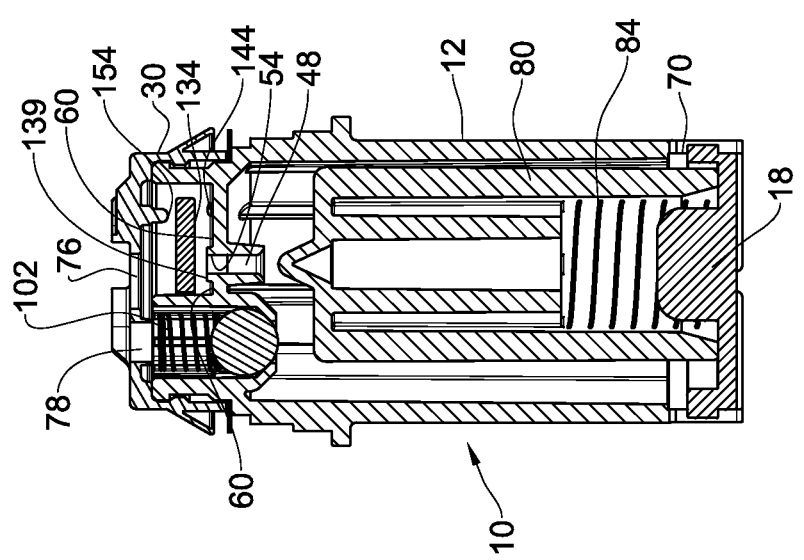
FIG. 6B illustrates the valve according to the presently disclosed subject matter with the pressure retention valve displaced into its open position.

In FIG. 6B the roll-over valve (ROV) remains at its normally open position and the over-pressure relief valve (OPR) 90 is at its normally closed position, however the pressure retention valve (PRV) 130 is displaced into its open position facilitating moderate pressure relief e.g. at the event of fueling the vehicle.

Figure 6C:
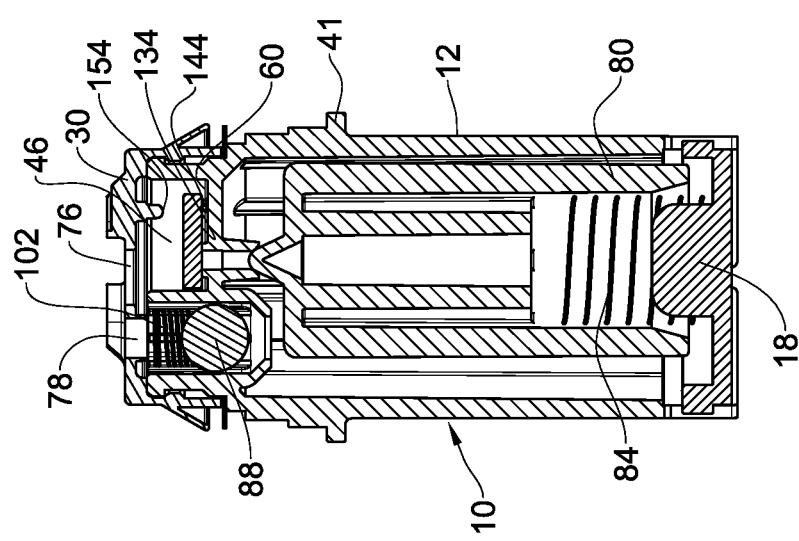
FIG. 6C illustrates the valve according to the presently disclosed subject matter at an up-side down position with the roll-over valve displaced into its closed position.

In FIG. 6C the valve 10 is illustrated at an up-side down position, simulating roll-over of the vehicle, wherein the roll-over valve (ROV) displaces into its closed position to prevent fuel escape from the fuel tank. At this position the over-pressure relief valve (OPR) 90 remains at its normally closed position. As illustrated, the pressure retention valve (PRV) 130 is displaced into its open position, however owing to the closed roll-over valve (ROV) there is no fuel escape therethrough.

While there has been shown an example of the disclosed subject matter, it is to be understood that many changes may be made therein without departing from the spirit of the present disclosed subject matter, mutandis mutatis.

The invention claimed is:

1. A fuel valve, comprising:
   a valve housing accommodating a roll-over valve (ROV);
   an over-pressure relief valve (OPR); and
   a pressure retention valve (PRV), the PRV comprising
      a pressure retention disc that is substantially axially displaceable within a top chamber of the valve housing, between a normally closed position in which the pressure retention disc sealingly bears over an outlet port of a fluid flow path and an open position, the pressure retention disc having a center of gravity thereof coaxial with said outlet port and being configured with a cutout portion at least partially enveloping a wall portion of a pressure relief port of the valve.

2. The fuel valve according to claim 1, wherein the housing is configured with a partition wall defining the fluid flow path extending between a bottom chamber configured with an inlet port and the top chamber configured with the outlet port; the bottom chamber accommodates a spring loaded float member axially displaceable between a closed position wherein a sealing head of the float member sealingly engages the inlet port of the fluid flow path, and a normally open position wherein the sealing head is disengaged from the inlet port; a pressure relief port extending between the bottom chamber and a valve outlet and being normally sealed by a sealing plunger biased into sealing engagement within the top chamber.

3. The fuel valve according to claim 2, wherein the cutout portion of the pressure retention disc has a crescent-like or U-like or kidney-like shape.

4. The fuel valve according to claim 2, wherein the outlet port of the fluid flow path has an annular rim elevated from a top face of the partition wall, the annular rim configured for sealingly bearing the pressure retention disc when at the closed position.

5. The fuel valve according to claim 2, wherein the partition wall is configured with at least one disc support upwardly extending from the top face, the at least one disc support extending slightly below the annular rim of the fluid flow path.

6. The fuel valve according to claim 5, wherein the at least one disc support is configured as an annular or a segmented support, or as a plurality of projections.

7. The fuel valve according to claim 2, wherein a top cap of the valve is configured with at least one projection extending into the top chamber, restricting displacement of the pressure retention disc in the open position thereof.

8. The fuel valve according to claim 7, wherein the at least one projection extends from a bottom surface of the top cap.

9. The fuel valve according to claim 2, wherein the shape, thickness and weight of the pressure retention disc define the retention pressure at which the pressure retention disc will displace from its normally closed position to its open position, during filling a fuel tank.

10. The fuel valve according to claim 2, wherein the sealing plunger is spherical.

11. The fuel valve according to claim 2, wherein biasing force applied to the sealing plunger, defines a pressure threshold for displacing the over-pressure relief valve (OPR) into the open position.

12. The fuel valve according to claim 2, wherein a center of gravity of the pressure retention disc coextends substantially above the fluid flow path.

13. The fuel valve according to claim 2, wherein the float member is axially displaceable within the housing along a longitudinal axis offset from a longitudinal axis of the housing.

14. A fuel valve, comprising:
a valve housing accommodating a roll-over valve (ROV);
an over-pressure relief valve (OPR); and
a pressure retention valve (PRV), the PRV comprising
   a pressure retention disc that is substantially axially displaceable within a top chamber of the valve housing, between a normally closed position in which the pressure retention disc sealingly bears over an outlet port of a fluid flow path and an open position,
the pressure retention disc is configured with a cutout portion at least partially enveloping a wall portion of pressure relief port of the valve,
wherein the housing is configured with a partition wall defining the fluid flow path extending between a bottom chamber configured with an inlet port and the top chamber configured with the outlet port, the bottom chamber accommodates a spring loaded float member axially displaceable between a closed position wherein a sealing head of the float member sealingly engages said inlet port of the fluid flow path, and a normally open position wherein the sealing head is disengaged from the inlet port, a pressure relief port extending between the bottom chamber and a valve outlet and being normally sealed by a sealing plunger biased into sealing engagement within the top chamber,
wherein the pressure retention disc has a circle segment removed, substantially opposite the cutout portion, to thereby facilitate fast pressure relief.

15. A fuel valve, comprising:
a valve housing accommodating a roll-over valve (ROV),
an over-pressure relief valve (OPR), and
a pressure retention valve (PRV), the PRV comprising
   a pressure retention disc that is substantially axially displaceable within a top chamber of the valve housing, between a normally closed position in which the pressure retention disc sealingly bears over an outlet port of a fluid flow path and an open position, the pressure retention disc is configured with a cutout portion at least partially enveloping a wall portion of pressure relief port of the valve,
wherein the housing is configured with a partition wall defining the fluid flow path extending between a bottom chamber configured with an inlet port and the top chamber configured with the outlet port; the bottom chamber accommodates a spring loaded float member axially displaceable between a closed position wherein a sealing head of the float member sealingly engages said inlet port of the fluid flow path, and a normally open position wherein the sealing head is disengaged from the inlet port, a pressure relief port extending between the bottom chamber and a valve outlet and being normally sealed by a sealing plunger biased into sealing engagement within the top chamber,
wherein a valve outlet of the over-pressure relief valve (OPR) and an outlet of the top chamber are discrete.

* * * * *